(12) United States Patent
Chang et al.

(10) Patent No.: US 10,168,052 B2
(45) Date of Patent: Jan. 1, 2019

(54) COMBUSTOR BULKHEAD HEAT SHIELD (71) Applicant: United Technologies Corporation, Hartford, CT (US)

(72) Inventors: Hoyt Y. Chang, Manchester, CT (US); Stephen K. Kramer, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 272 days.

(21) Appl. No.: 14/916,358

(22) PCT Filed: Sep. 3, 2014

(86) PCT No.: PCT/US2014/053785
§ 371 (c)(1),
(2) Date: Mar. 3, 2016

(87) PCT Pub. No.: WO2015/034861
PCT Pub. Date: Mar. 12, 2015

(65) Prior Publication Data
US 2016/0201911 A1 Jul. 14, 2016

Related U.S. Application Data

(60) Provisional application No. 61/873,479, filed on Sep. 4, 2013.

(51) Int. Cl.
*F23R 3/60* (2006.01)
*F02C 3/04* (2006.01)
(Continued)

(52) U.S. Cl.
CPC .................. *F23R 3/60* (2013.01); *F02C 3/04* (2013.01); *F02C 7/24* (2013.01); *F23M 5/04* (2013.01);
(Continued)

(58) Field of Classification Search
CPC .. F23R 3/60; F23R 3/002; F23R 3/007; F02C 7/24; F23M 5/00; F23M 5/04; F05D 2240/35
See application file for complete search history.

(56) References Cited

U.S. PATENT DOCUMENTS 4,363,208 A * 12/1982 Hoffman .................. F23R 3/60
431/352
5,271,220 A 12/1993 Holmes et al.
(Continued)

FOREIGN PATENT DOCUMENTS

FR 2909998 6/2008
GB 2317005 3/1998
(Continued)

OTHER PUBLICATIONS

International Preliminary Report on Patentability for Application No. PCT/US2014/053785 dated Mar. 17, 2016.
(Continued)

*Primary Examiner* — Steven Sutherland
(74) *Attorney, Agent, or Firm* — Carlson, Gaskey & Olds, P.C.

(57) ABSTRACT

A heat shield for a combustor includes a ring shaped body including a central opening defining a radially inner edge of the ring shaped body. The ring shaped body is at least partially made of a ceramic material. The heat shield includes a shaped portion designed to enhance an interference fit.

17 Claims, 5 Drawing Sheets

(51) Int. Cl.
  *F02C 7/24*   (2006.01)
  *F23M 5/04*   (2006.01)
  *F23R 3/00*   (2006.01)

(52) U.S. Cl.
  CPC .............. *F23R 3/002* (2013.01); *F23R 3/007* (2013.01); *F05D 2220/32* (2013.01); *F05D 2230/60* (2013.01); *F05D 2240/24* (2013.01); *F05D 2240/35* (2013.01); *F05D 2260/231* (2013.01); *F05D 2300/6033* (2013.01); *F23R 2900/00017* (2013.01)

(56) References Cited

U.S. PATENT DOCUMENTS

| | | |
|---|---|---|
| 5,609,031 A | 3/1997 | Jones |
| 6,546,733 B2 * | 4/2003 | North ................. F23R 3/002 60/740 |
| 6,773,215 B2 | 8/2004 | Cuva et al. |
| 7,044,709 B2 | 5/2006 | Bruce et al. |
| 7,581,301 B2 | 9/2009 | Arbona et al. |
| 7,832,972 B2 | 11/2010 | Jarmon |
| 2002/0178734 A1 | 12/2002 | Stastny |
| 2003/0213250 A1 | 11/2003 | Pacheco-Tougas et al. |
| 2004/0110041 A1 * | 6/2004 | Merrill ................... C04B 35/10 428/699 |
| 2004/0118127 A1 | 6/2004 | Mitchell et al. |
| 2005/0238888 A1 * | 10/2005 | Spitsberg ............. C23C 28/042 428/446 |
| 2007/0048144 A1 | 3/2007 | Morrison et al. |
| 2007/0220735 A1 | 9/2007 | Arbona et al. |
| 2008/0092546 A1 | 4/2008 | Stastny et al. |
| 2009/0293488 A1 | 12/2009 | Coughlan et al. |
| 2009/0324393 A1 | 12/2009 | Gonzalez et al. |
| 2013/0192233 A1 | 8/2013 | Eastwood et al. |

FOREIGN PATENT DOCUMENTS

| | | |
|---|---|---|
| JP | 2007510121 | 4/2007 |
| JP | 2011237169 | 11/2011 |

OTHER PUBLICATIONS

International Search Report and Written Opinion for Application No. PCT/US2014/053785 dated Dec. 12, 2014.
Supplementary European Search Report for Application No. 14842521.8 dated Aug. 19, 2016.

* cited by examiner

COMBUSTOR BULKHEAD HEAT SHIELD

CROSS-REFERENCE TO RELATED APPLICATION

This application claims priority to U.S. Provisional Application No. 61/873,479 filed Sep. 4, 2013.

TECHNICAL FIELD

The present disclosure relates generally to a combustor for a gas turbine engine, and more particularly to a combustor bulkhead heat shield.

BACKGROUND OF THE INVENTION

Gas turbine engines are generally known and, when used on an aircraft, typically include a fan delivering air into a bypass duct and a compressor section. Air from the compressor section is passed downstream into a combustion section where it is mixed with fuel and ignited. Products of this combustion pass downstream over turbine rotors driving the turbine rotors to rotate.

Some existing gas turbine engines utilize a metallic bulkhead within the combustion section. The metallic bulkhead is either made as a single integral unit, or assembled from multiple bulkhead panels. Existing metallic bulkhead panels are coated on an internal surface with a heat resistant coating to resist the extreme temperatures resulting from combustion. In some examples, oxidation of heat resistant coatings on the bulkhead panels can be extreme and shorten the life of the combustor. In order to combat high temperatures, engines have been designed using alternate materials to create the combustor itself or using a liner made from an alternate material within the combustor and affixed to the combustor via fasteners.

SUMMARY OF THE INVENTION

A gas turbine engine according to an exemplary embodiment of this disclosure, among other possible things includes a compressor section, a combustor in fluid communication with the compressor section, a turbine section in fluid communication with the combustor, the combustor further including a combustor region defined by at least one bulkhead panel, and at least one heat shield panel interior to the combustor region, the at least one heat shield panel is connected to the bulkhead panel via an interference fit.

In a further embodiment of the foregoing gas turbine engine, the heat shield panel includes at least one layer of a ceramic matrix composite (CMC) material and at least one layer of a high heat tolerance machinable temperature material.

In a further embodiment of the foregoing gas turbine engine, the high heat tolerance machinable material includes silicon.

In a further embodiment of the foregoing gas turbine engine, the combustor further includes an outer diameter combustor shell and an inner diameter combustor shell, at least one of the outer diameter combustor shell and the inner diameter combustor shell includes a protrusion into the combustor and an edge of the heat shield panel is axially positioned between the protrusion and the bulkhead relative to an axis defined by the gas turbine engine.

In a further embodiment of the foregoing gas turbine engine, each of the outer diameter combustor shell and the inner diameter combustor shell includes a protrusion into the combustor and an inner diameter edge of the heat shield panel is axially positioned between the protrusion on the inner diameter combustor shell and the bulkhead, and a portion of the heat shield panel is axially positioned between the protrusion on the outer diameter combustor shell and the bulkhead.

In a further embodiment of the foregoing gas turbine engine, the interference fit is an interference fit between the protrusion, the bulkhead and one of the inner diameter edge and the outer diameter edge of the heat shield panel.

In a further embodiment of the foregoing gas turbine engine, the heat shield panel has a primary axial thickness and a secondary axial thickness, where the secondary axial thickness is positioned proximate to at least one of an inner diameter and an outer diameter.

In a further embodiment of the foregoing gas turbine engine, the heat shield panel includes a plurality of axially aligned through holes, and the combustor includes a plurality of swirlers protruding into the axially aligned through holes.

In a further embodiment of the foregoing gas turbine engine, the combustor further includes a plurality of outer liner panels and a plurality of inner liner panels, and at least one panel of the plurality of outer liner panels and the plurality of inner liner panels includes an interference fit protection feature.

In a further embodiment of the foregoing gas turbine engine, the interference fit protection feature includes a portion of a liner closest to the heat shield panel, and the portion is curved toward a center of the combustion region.

A heat shield for a combustor according to an exemplary embodiment of this disclosure, among other possible things includes a ring shaped body including a central opening defining a radially inner edge of the ring shaped body, the ring shaped body includes a ceramic material, a plurality of through holes distributed circumferentially about the ring shaped body, and an interference fit shaped portion on at least one of the radially inner edge and a radially outward edge of the heat shield.

A further embodiment of the foregoing heat shield includes a high heat tolerance machinable material layer applied to all sides of the heat shield.

In a further embodiment of the foregoing heat shield, the high heat tolerance machinable layer includes silicon.

A further embodiment of the foregoing heat shield includes an interference fit shaped portion on both the radially inner edge and a radially outer edge.

In a further embodiment of the foregoing heat shield, the interference fit shaped portion has a larger thickness along an axis defined by the ring shaped body than the thickness of the body along the same axis.

In a further embodiment of the foregoing heat shield, the interference fit shaped portion is a rounded bulb shape and the bulb shape has a diameter larger than a thickness of the body along an axis defined by the ring shaped body.

In a further embodiment of the foregoing heat shield, an edge of the ring shaped body extends into the interference fit shaped portion.

In a further embodiment of the foregoing heat shield, the ring shaped body includes a ceramic matrix composite (CMC) material.

A method for constructing a combustor according to an exemplary embodiment of this disclosure, among other possible things includes the step of maintaining a heat shield adjacent to at least one bulkhead panel using an interference fit.

In a further embodiment of the foregoing method, the interference fit is an interference between an interference feature on at least one of a radially outward edge of the heat shield and an interference feature on a radially inner edge of the heat shield, a bulkhead, and a protrusion feature on a combustor shell.

These and other features of the present invention can be best understood from the following specification and drawings, the following of which is a brief description.

DETAILED DESCRIPTION OF AN EMBODIMENT

Figure 1:
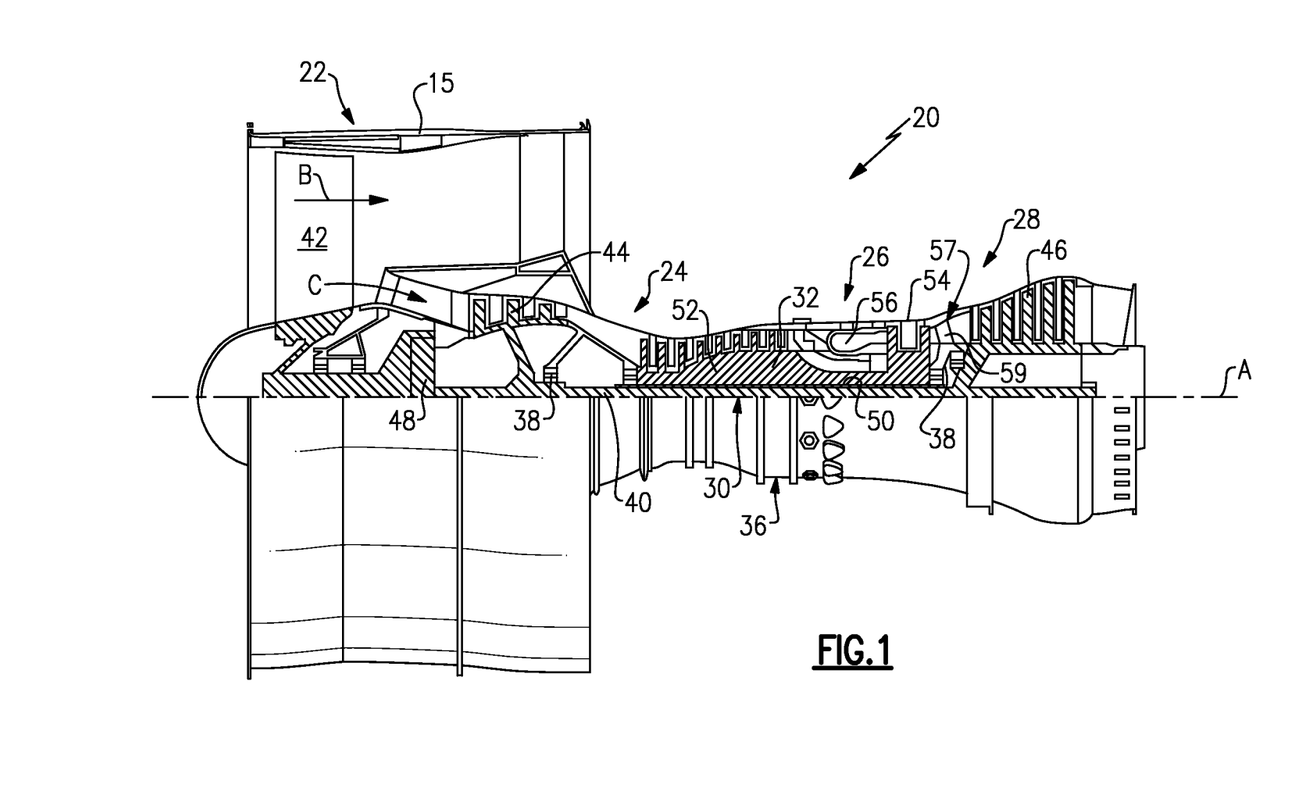
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

Figure 2:
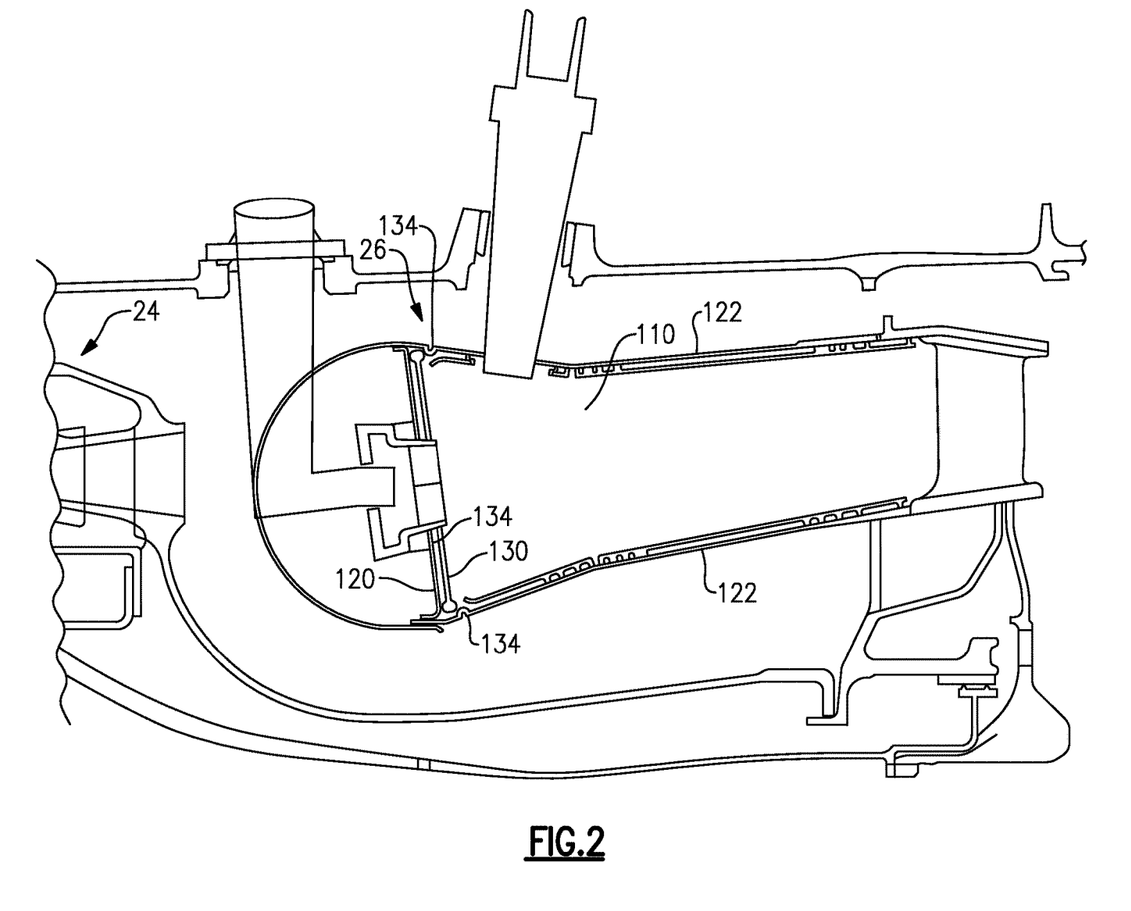
FIG. 2 schematically illustrates a combustor section of the gas turbine engine of FIG. 1 in greater detail.

FIG. 2 schematically illustrates the combustor section 26 of the gas turbine engine of FIG. 1 in greater detail. The combustor section 26 includes a combustion region 110 in which fuel is combusted. The combustor section 26 is defined by a combustor bulkhead 120, and one or more combustor panels 122 that are combined to form an annular combustor shape. The combustor shells 122 are connected to each other using known fastening means. The shells 122 are full hoop sheet metal shells and are designed to handle a pressure load and other mechanical loads. Lining the combustor bulkhead 120, and within the combustion region 110, is a ceramic matrix composite (CMC) heat shield 130. The CMC heat shield 130 is maintained in position via an interference fit between the combustor bulkhead 120, the heat shield 130, and a protrusion feature 134 located on at least one of the combustor shells 122. While the example of FIG. 2 illustrates a protrusion feature positioned on both the inner combustor shell 122 and the outer combustor shell 122 it is understood that alternate examples could maintain the interference fit using only one protrusion feature positioned on either the inner diameter combustor shell 122 or the outer diameter combustor shell 122. Further, it is understood that the particular "bump" shape of the protrusion feature 134 illustrated in FIG. 2 is purely exemplary and alternate shaped protrusion features can be used to the same affect.

During operation of the turbine engine 20, compressed air from the compressor section 24 passes around the combustor section 26 and impinges on an external surface of the combustor bulkhead 120. Due to the extreme heat generated within the combustor 56, the gas exiting the compressor section 24 and impinging upon the combustor bulkhead 120 is cool relative to the temperatures in the combustor 56. The combustor bulkhead 120 includes multiple small cooling holes through which the impinging air can pass. Disposed between the bulkhead 120 and the heat shield 130 is a gap 132. The impinging air enters the gap 132 through the holes in the combustor bulkhead 120 and provides a cooling effect on the heat shield 130.

As described above, the illustrated heat shield 130 is constructed of a ceramic matrix composite (CMC) material, and has a very high heat tolerance. CMC materials, however, are prone to breakage any place where a fault or stress is introduced into the material. By way of example, this type of fault or stress is introduced anywhere that a threaded component is threaded through the heat shield 130. Heat shields 130 constructed of traditional materials, such as nickel alloys, are typically connected to the bulkhead panel via physical fasteners that use a threaded bolt/nut arrangement. As described above, passing the threaded bolt through the CMC material of the heat shield 130 introduces a fault into the CMC material. This fault is exacerbated by thermal expansion and contraction and can lead to an early breakdown, such as cracking or delamination of the heat shield 130, resulting in more frequent repairs.

Figure 3:
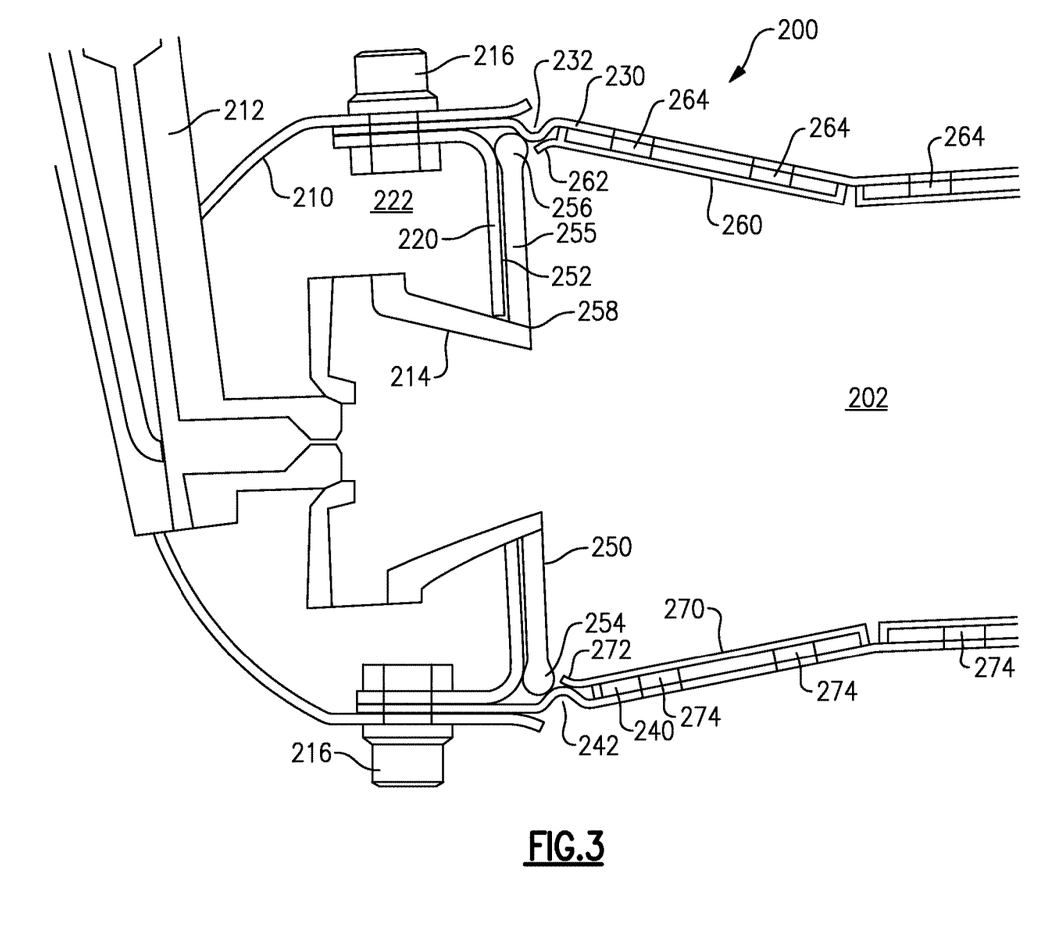
FIG. 3 schematically illustrates a zoomed in partial view of the combustor section of FIG. 2.

FIG. 3 illustrates a partial cross section of a bulkhead portion of an annular combustor 200 showing the position of the heat shield 130 in greater detail. The combustor 200 is generally formed of a hood 210, a bulkhead panel 220, an outer combustor shell 230, and an inner diameter combustor shell 240. The hood 210, bulkhead shell 220 and the outer diameter combustor shell 230 are joined on an outer diameter edge of the annular combustor 200 via a fastener 216. Similarly, the hood 210, the bulkhead shell 220 and the inner diameter combustor panel 240 are fastened together on an inner diameter edge via a fastener 216. While the illustrated annular combustor 200 shows a single fastener 216 on each edge, it is understood that multiple fasteners 216 can be distributed around the annular combustor, thereby ensuring a solid assembly.

The hood 210 and the bulkhead panel 220 define a cavity 222. A fuel line 212 protrudes into the cavity 222 and provides fuel to a swirler 214. The swirler 214 protrudes through a corresponding hole in the bulkhead panel 220 and provides fuel into a combustion region 202 where the fuel is ignited. While only a single fuel line 212 and swirler 214 are shown in the illustration of FIG. 3, it is understood that multiple fuel lines 212 and swirlers 214 are disposed circumferentially about the annular combustor 200

In order to protect the bulkhead panel 220 from the heat generated by combustion in the combustor region 202, a heat shield panel 250 is placed adjacent to the bulkhead panel 220 and includes multiple openings 258 through which the swirlers 214 protrude. The heat shield panel 250 is constructed at least partially of a CMC material and protects the metal bulkhead panel 220 by absorbing the combustion heat, and thereby minimizing the amount of heat that the bulkhead panel 220 is exposed to. Similar to the heat shield panel 250, metal combustor liners 260, 270 are affixed to the outer diameter combustor shell 230 and the inner diameter combustor shell 240 and serve a similar function to the heat shield panel 250.

In existing combustor designs, the heat shield panels 250 are constructed of a metal material and are maintained in position relative to the bulkhead panel 220 via one or more fasteners that are threaded through the heat shield panel 250. As described above, CMC materials, such as those used in the construction of the instant heat shield panel 250 can be weakened or break when a fastener is threaded through the heat shield panel 250. In order to minimize this possibility, the heat shield panel 250 in the annular combustor 200 of FIG. 3 is maintained in position via an interference fit.

The interference fit is between the metal bulkhead panel 220 and an interference feature 232, 242 on the outer diameter combustor shell 230 or the inner diameter combustor shell 240. In the example combustor 200 of FIG. 3, the interference features 232, 242 are protrusions into the combustion region 202 of the combustor 200. In alternate examples, the heat shielding panel 250 can be maintained in position using only a radially inner interference fit or a radial outer interference fit and the interference feature 232, 234 on the opposite edge can be omitted.

As a further component of the interference fit, in some examples the inner diameter liner 270 and the outer diameter liner 260 closest to the interference fit include a protection feature 262, 272. The protection features 262, 272 curve inwards toward a center of the combustion region 202 and protect at least a portion of the inward protrusions (the interference features 232, 242) from the heat of the combustion in the combustion region 202. As with the interference fit, the protection features 262, 272 can be located on either the inner diameter (protection feature 272) or the outer diameter (protection feature 262) or both, as in the illustrated example. The protection features 262, 272 can further protect the interference fits and the joints between the combustor panels 230, 240 and the bulkhead panel 220 by directing airflow away from the interference fit and the joint as a result of the curvature.

To further aid with the interference fit, each end of the heat shield panel 250 includes a shaped region 256, 254 that is wider than a main body portion 255 of the heat shield panel 250. The shaped region 254, 256 fits between the metal bulkhead panel 220 and the corresponding interference feature 232, 242 and is shaped to enhance the interference fit. The illustrated shaped region 254, 256 is a bulb shape. It is understood however, that alternate shapes could also be determined and used by one of skill in the art having the benefit of this disclosure. Once assembled, the interference feature 232, 242 pinches the shaped region 254, 256 against the metal bulkhead panel 220 thereby holding the heat shield panel 250 in position. In this way, the heat shield panel 250 can be maintained in position without requiring the utilization of fasteners that can weaken or damage the heat shield panel 250.

The shaped regions 254, 256 further facilitate a gap 252 between the main body portion 255 of the heat shield panel 250. The gap 252 is a cooling gap 252. In practical embodiments, the metal bulkhead 220 includes multiple small holes disposed about the bulkhead 220, and the cavity 222 is not airtight. As a result, relatively cool air enters the cavity 222 from the compressor section and passes through the metal bulkhead 220. The relatively cool air impinges on the heat shield panel 250, providing a cooling effect to the heat shield panel 250.

Figure 4:
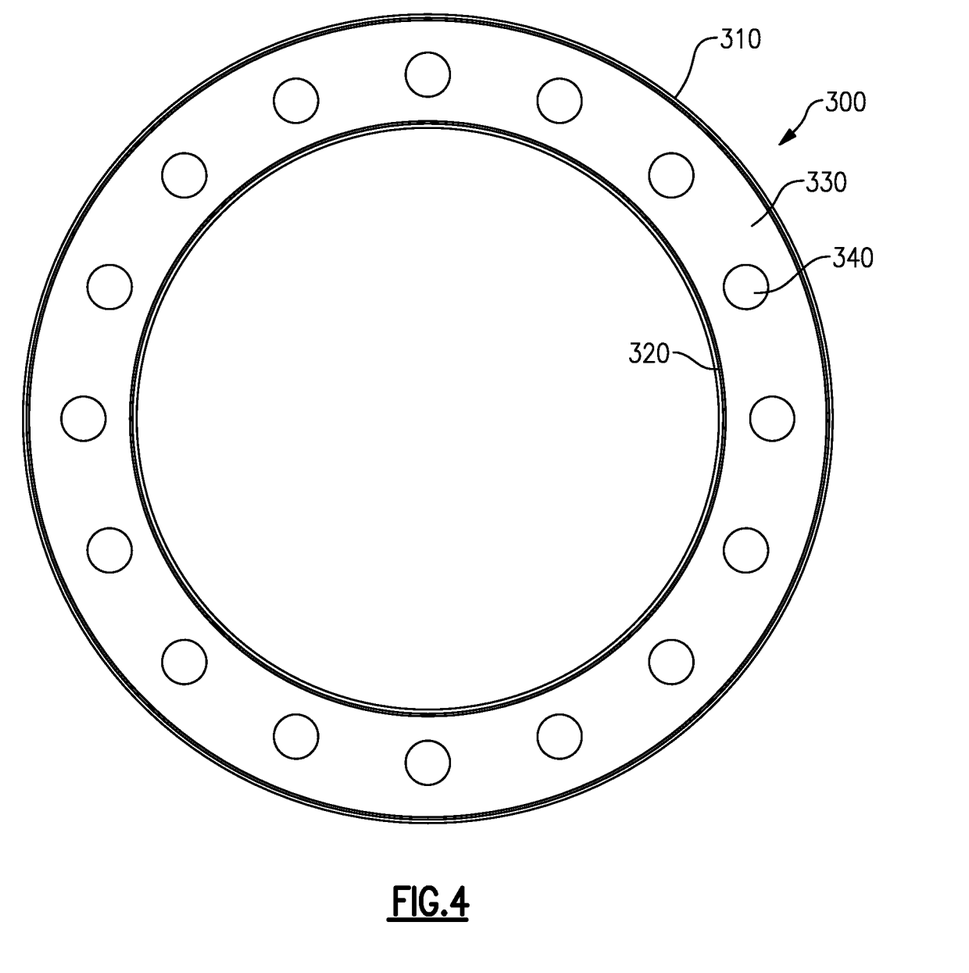
FIG. 4 schematically illustrates a fore view of a bulkhead heat shield for a combustor.

FIG. 4 illustrates a fore view of a heat shield panel 300, such as the heat shield panel 250 illustrated in the annular combustor of FIG. 3. The heat shield panel 300 includes an outer diameter shaped region 310 along an outer edge of the ring corresponding to the outer shaped region 256 of the heat shielding panel illustrated in FIG. 3. Similarly, the heat shield panel 300 includes an inner diameter shaped region 320 along the inner edge of the ring corresponding to the inner shaped region 254 of FIG. 3, and multiple swirler holes 340 disposed circumferentially about the heat shield panel 300. While the illustrated example includes sixteen swirler holes 340 distributed evenly about the heat shield panel 300, it is understood that an alternate number of swirler holes 340 could be utilized and that the swirler holes need not be evenly distributed in all examples.

Figure 5:
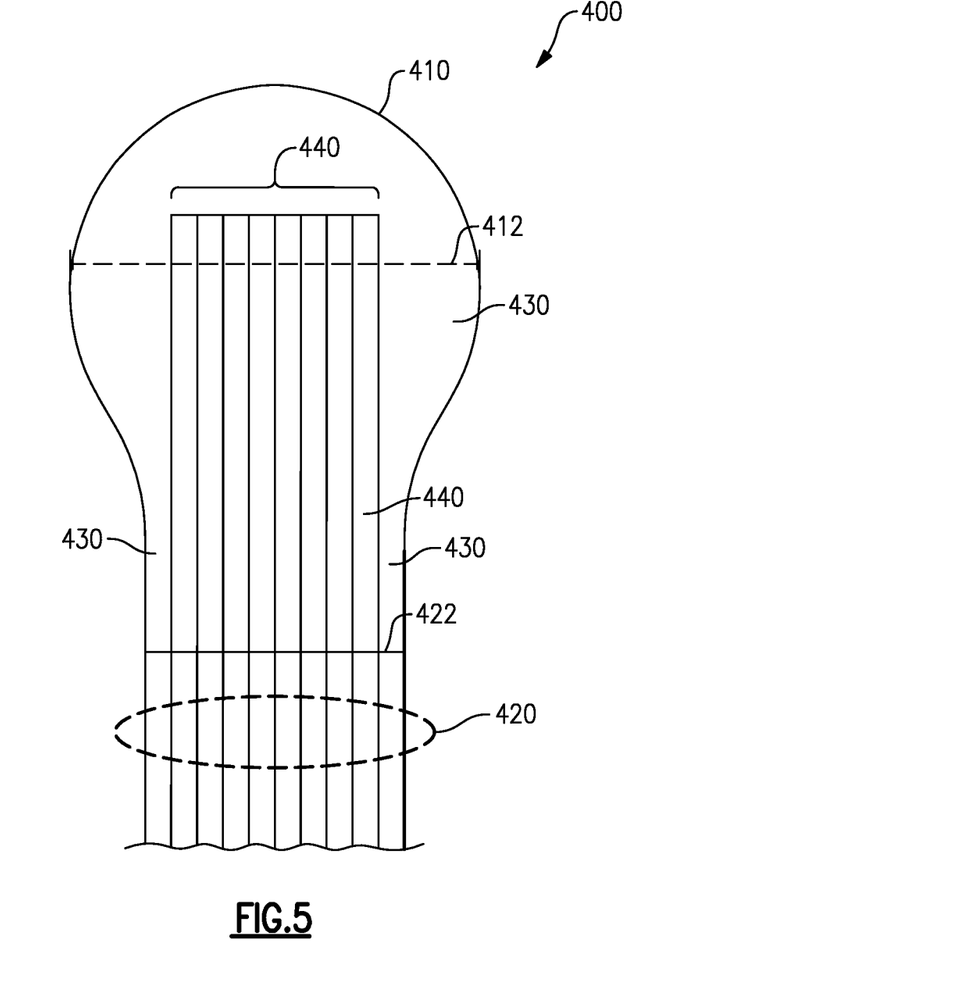
FIG. 5 illustrates a partial cross sectional view of the bulkhead heat shield of FIG. 4.

FIG. 5 illustrates a partial cross sectional view of a heat shield panel 400 that can be utilized in the examples of FIG. 2-4. The heat shield panel 400 includes a shaped region 410 on at least one of an inner diameter edge or an outer diameter edge of the heat shield panel 400. The shaped region 410 has an axial thickness 412 that is defined as the axially thickest portion of the shaped region 410. A main body portion 420 of the heat shield panel 400 is located between the shaped regions 410 in heat shields 400 including a shaped region 410 on both a radially inner and a radially outer edge. In the illustrated example, the main body region extends into the interior of the shaped region 410.

The main body portion 420 of the heat shield panel 400 has an axial thickness 422. The axial thickness 422 of the main body portion 420 is smaller than the axial thickness 412 of the shaped region 410. This enhances the interference fit of the heat shield panel 400 and provides for the creation of the cooling gap described above.

The heat shield panel 400 is constructed primarily of two different materials and techniques. The first material utilized is the above described CMC material can be formed in multiple CMC layers 440. The CMC layers form the basic heat shield 400 ring shape, including the swirler holes and excluding the shaped regions 410. Once the basic shape of the heat shield 400 is formed from the heat resistant CMC material, a high heat tolerance machinable material layer 430 is applied over top of the CMC layers 440. In one example, the high heat tolerance machinable layer 430 is a material comprised at least partially of silicon. A high heat tolerance machinable material is any material that can withstand extremely high temperatures, and can be machined to a desired shape or dimension without loss of the high heat tolerance. The high heat tolerance machinable material layer 430 is then machined to create a thinner main body portion having a uniform thickness and the shaped region 410.

In alternate examples the entire heat shield panel 400 is formed from the CMC material, and a machinable high heat tolerant coating material is not required. Examples utilizing purely a CMC material are more difficult to produce and can in some cases have a lower expected part lifetime. Alternatively, a pure ceramic (monolith ceramic) material can be used in place of the CMC material.

The bulkhead heat shield described above can be modified by one of skill in the art having the benefit of this disclosure to function in a can style combustor as well as the above described annular combustor. Thus, one alternative to the above described system is replacing the annular combustor with a can combustor.

While the examples illustrated herein utilize a bulb shape, or rounded, region for the shaped portion, it is understood that the shaped region 410 can be shaped in any shape that provides a tight interference fit with the bulkhead panel and the combustor panels.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section;
a combustor in fluid communication with the compressor section;
a turbine section in fluid communication with the combustor;
said combustor further comprising a combustor region defined by at least one bulkhead panel and at least one combustor wall, and at least one heat shield panel interior to said combustor region, wherein said at least one heat shield panel is maintained between said at least one bulkhead panel and said at least one combustor wall via an interference fit at a radially outward edge of the at least one heat shield panel.

2. A gas turbine engine comprising:
a compressor section;
a combustor in fluid communication with the compressor section;
a turbine section in fluid communication with the combustor;
said combustor further comprising a combustor region defined by at least one bulkhead panel and at least one combustor wall, and at least one heat shield panel interior to said combustor region, wherein said at least one heat shield panel is maintained between said at least one bulkhead panel and said at least one combustor wall via an interference fit; and
wherein said at least one heat shield panel comprises a plurality of axially aligned through holes, and wherein said combustor comprises a plurality of swirlers protruding into said plurality of axially aligned through holes.

3. A gas turbine engine comprising:
a compressor section;
a combustor in fluid communication with the compressor section;
a turbine section in fluid communication with the combustor;
said combustor further comprising a combustor region defined by at least one bulkhead panel and at least one combustor wall, and at least one heat shield panel interior to said combustor region, wherein said at least one heat shield panel is maintained between said at least one bulkhead panel and said at least one combustor wall via an interference fit; and wherein said combustor further comprises a plurality of outer liner panels and a plurality of inner liner panels, and wherein at least one panel of said plurality of outer liner panels and said plurality of inner liner panels comprises a portion curved toward a center of the combustor region.

4. The gas turbine engine of claim 3, wherein said at least one heat shield panel comprises at least one layer of a ceramic matrix composite (CMC) material and at least one layer of a high heat tolerance machinable temperature material.

5. The gas turbine engine of claim 4, wherein said high heat tolerance machinable material comprises silicon.

6. The gas turbine engine of claim 3, wherein said at least one combustor wall further comprises an outer diameter combustor shell and an inner diameter combustor shell, wherein at least one of said outer diameter combustor shell and said inner diameter combustor shell includes a protrusion into said combustor and wherein an edge of said at least one heat shield panel is axially positioned between said protrusion and said at least one bulkhead panel relative to an axis defined by said gas turbine engine.

7. The gas turbine engine of claim 6, wherein each of said outer diameter combustor shell and said inner diameter combustor shell includes a protrusion into said combustor and wherein an inner diameter edge of said at least one heat shield panel is axially positioned between said protrusion on said inner diameter combustor shell and said at least one bulkhead panel, and wherein a portion of said at least one heat shield panel is axially positioned between said protrusion on said outer diameter combustor shell and said at least one bulkhead panel.

8. The gas turbine engine of claim 6, wherein said interference fit is an interference fit between said protrusion, said at least one bulkhead panel and one of an inner diameter edge and an outer diameter edge of said at least one heat shield panel.

9. The gas turbine engine of claim 3, wherein said at least one heat shield panel has a primary axial thickness and a secondary axial thickness, where said secondary axial thickness is positioned proximate to one of an inner diameter and an outer diameter.

10. The gas turbine engine of claim 3, wherein said portion is an interference fit protection feature and is a portion of a liner closest to the at least one heat shield panel.

11. A heat shield for a combustor comprising:
a ring shaped body including a central opening defining a radially inner edge of the ring shaped body, the ring shaped body comprising a ceramic material,
a plurality of through holes distributed circumferentially about the ring shaped body;
an interference fit shaped portion on at least one of said radially inner edge and a radially outward edge of the heat shield; and
wherein said interference fit shaped portion is a rounded bulb shape and wherein said rounded bulb shape has a diameter larger than a thickness of said ring shaped body along an axis defined by the ring shaped body.

12. The heat shield of claim 11, further comprising a high heat tolerance machinable material layer applied to all sides of said heat shield.

13. The heat shield of claim 12, wherein said high heat tolerance machinable layer comprises silicon.

14. The heat shield of claim 11, further comprising an interference fit shaped portion on both said radially inner edge and a radially outer edge of the ring shaped body.

15. The heat shield of claim 11, wherein said interference fit shaped portion has a first thickness along an axis defined by the ring shaped body, the ring shaped body has a second thickness along the axis defined by the ring shaped body, and the first thickness is larger than the second thickness.

16. The heat shield of claim 11, wherein an edge of said ring shaped body extends into the interference fit shaped portion.

17. The heat shield of claim 11, wherein the ring shaped body comprises a ceramic matrix composite (CMC) material.

* * * * *